(12) United States Patent
Tsuji et al.

(10) Patent No.: US 12,208,674 B2
(45) Date of Patent: Jan. 28, 2025

(54) TRACTOR

(71) Applicant: Kubota Corporation, Osaka (JP)

(72) Inventors: Kenichiro Tsuji, Osaka (JP); Hiroki Nakatsuka, Osaka (JP); Ryuichi Inoue, Osaka (JP)

(73) Assignee: Kubota Corporation, Osaka (JP)

( * ) Notice: Subject to any disclaimer, the term of this patent is extended or adjusted under 35 U.S.C. 154(b) by 146 days.

(21) Appl. No.: 17/975,970

(22) Filed: Oct. 28, 2022

(65) Prior Publication Data

US 2023/0118454 A1 Apr. 20, 2023

(30) Foreign Application Priority Data

Sep. 30, 2021 (JP) ................................ 2021-162217

(51) Int. Cl.
| | |
|---|---|
| B60K 13/04 | (2006.01) |
| B60K 1/04 | (2019.01) |
| B60K 11/02 | (2006.01) |
| B60K 11/04 | (2006.01) |
| B60K 15/063 | (2006.01) |
| F01N 13/00 | (2010.01) |

(52) U.S. Cl.
CPC ............ *B60K 13/04* (2013.01); *F01N 13/002* (2013.01); *B60K 2001/0405* (2013.01); *B60K 2001/0411* (2013.01); *B60K 11/02* (2013.01); *B60K 11/04* (2013.01); *B60K 2015/0636* (2013.01); *B60K 2015/0637* (2013.01); *B60Y 2200/221* (2013.01); *F01N 13/004* (2013.01); *F01N 13/008* (2013.01); *F01N 2340/04* (2013.01); *F01N 2340/06* (2013.01); *F01N 2590/08* (2013.01); *F01N 2610/14* (2013.01); *F01N 2610/1406* (2013.01); *F01N 2900/104* (2013.01)

(58) Field of Classification Search
CPC combination set(s) only.
See application file for complete search history.

(56) References Cited

U.S. PATENT DOCUMENTS

| | | | |
|---|---|---|---|
| 2013/0294876 A1* | 11/2013 | Kobayashi ............ | E02F 9/0883 414/744.2 |
| 2015/0135686 A1* | 5/2015 | Hasegawa ........... | F01N 13/1805 60/297 |
| 2016/0082830 A1* | 3/2016 | Okamura ........... | B62D 33/0617 180/309 |
| 2016/0222631 A1* | 8/2016 | Kohno ................ | H01M 10/647 |
| 2016/0311314 A1* | 10/2016 | Kurokawa ............ | E02F 9/0891 |
| 2018/0245310 A1* | 8/2018 | Kumagai .................. | E02F 3/32 |

FOREIGN PATENT DOCUMENTS

JP 2015-45234 A 3/2015

* cited by examiner

*Primary Examiner* — Binh Q Tran
(74) *Attorney, Agent, or Firm* — Osha Bergman Watanabe & Burton LLP

(57) ABSTRACT

A tractor includes: a vehicle body; an engine disposed in an engine compartment; a radiator that is disposed, in the engine compartment, further toward a vehicle-body front side than the engine and cools the engine; an exhaust-gas cleaning device that purifies exhaust gas exhausted from the engine using a reducing agent; a reducing-agent tank that stores the reducing agent supplied to the exhaust-gas cleaning device; and a battery, the reducing-agent tank being disposed, in the engine compartment, side-by-side with the battery and further toward the vehicle-body front side than the radiator.

8 Claims, 5 Drawing Sheets

TRACTOR

BACKGROUND

Technical Field

The present invention relates to a tractor.

Description of Related Art

Among tractors, there are those that are provided with a radiator that is disposed further toward a vehicle-body front side than an engine in an engine compartment and cools the engine, an exhaust-gas cleaning device that uses a reducing agent to subject exhaust gas exhausted by the engine to a cleaning process, and a reducing-agent tank that stores the reducing agent supplied to the exhaust-gas cleaning device.

Among tractors of this type, there are those wherein, as illustrated in patent literature 1 for example, the reducing-agent tank (aqueous-urea tank) is disposed further toward a vehicle-body front side than the radiator in the engine compartment. By disposing the reducing-agent tank further toward the vehicle-body front side than the radiator in the engine compartment in this manner, the radiator serves as a heat-insulating wall positioned between the engine and the reducing-agent tank, the radiator suppresses heat transfer from the engine to the reducing-agent tank, and degrading of the reducing agent in the reducing-agent tank due to temperature escalation can be prevented.

PRIOR-ART LITERATURE

[Patent Literature 1] JP 2015-45234 A

When conventional art is applied, the reducing-agent tank is positioned above a battery. As such, when performing maintenance work on the battery, removing the reducing-agent tank is bothersome.

SUMMARY

One or more embodiments of the present invention provide a tractor that, despite providing a reducing-agent tank, together with a battery, further toward a vehicle-body front side than a radiator in an engine compartment, facilitates maintenance work on the battery while shortening a vehicle-body front-back-direction length (or a vehicle-body longitudinal direction) of the engine compartment.

A tractor of one or more embodiments of the present invention is provided with:

a vehicle body; an engine disposed in an engine compartment; a radiator that is disposed, in the engine compartment, further toward a vehicle-body front side than the engine and cools the engine; an exhaust-gas cleaning device that uses a reducing agent to subject exhaust gas exhausted by the engine to a cleaning process (purifies the exhaust gas exhausted from the engine using the reducing agent); and a reducing-agent tank that stores the reducing agent supplied to the exhaust-gas cleaning device; wherein the reducing-agent tank is provided, in the engine compartment, in a side-by-side state (disposed side-by-side) with a battery and further toward the vehicle-body front side than the radiator.

According to the present configuration, the reducing-agent tank and the battery are positioned side by side. As such, a space necessary for disposing the reducing-agent tank and the battery is kept shorter than when these are positioned front and back. Maintenance work on the battery can be performed even if the reducing-agent tank is left on a horizontal side of the battery. As such, despite the reducing-agent tank and the battery being disposed further toward the vehicle-body front side than the radiator in the engine compartment, maintenance work on the battery is facilitated while shortening the engine compartment.

In one or more embodiments of the present invention, a reducing-agent pump that supplies the reducing agent from the reducing-agent tank to the exhaust-gas cleaning device is provided in a side-by-side state (disposed side-by-side) with the reducing-agent tank on a horizontal (lateral) side of the battery.

According to the present configuration, the reducing-agent tank and the reducing-agent pump are positioned side by side. As such, a space necessary for disposing the reducing-agent tank and the reducing-agent pump is kept shorter than when these are positioned front and back. When performing maintenance work on the reducing-agent tank, maintenance work on the reducing-agent pump can be performed on a horizontal side of the reducing-agent tank. As such, maintenance work on the reducing-agent pump in conjunction with maintenance work on the reducing-agent tank is facilitated while shortening the engine compartment.

In one or more embodiments of the present invention, the battery is provided in a state wherein a long side of the battery is substantially parallel to a vehicle-body front-back direction.

According to the present configuration, a wider disposition space for the reducing-agent tank can be provided on a vehicle-body lateral side of the battery compared to the case where the long side of the battery is substantially parallel to a vehicle-body lateral width direction (or a vehicle-body horizontal direction). As such, disposing the reducing-agent tank is facilitated.

In one or more embodiments of the present invention, provided is a support plate that is provided on an upper portion than a vehicle body frame and supports a mounting base of the battery, a lower portion of the reducing-agent tank extends below the support plate (the reducing-agent tank has the lower portion extending lower than the support plate), and a notch portion is provided in a lower corner portion of the reducing-agent tank (the reducing-agent tank has the notch portion or a cut-out portion at the lower corner portion of the reducing-agent tank).

According to the present configuration, the lower portion of the reducing-agent tank extends below the support plate. As such, compared to enlarging a horizontal width of the reducing-agent tank, a capacity of the reducing-agent tank can be further increased while making it easier to ensure space for placing the reducing-agent tank and the battery side by side. The notch portion suppresses the increase in the capacity to prevent an excessive capacity increase in the lower portion of the reducing-agent tank. As such, storage-amount measurement using a float sensor or other sensor can be performed without hindrance.

In one or more embodiments of the present invention, a reducing-agent pump that supplies the reducing agent from the reducing-agent tank to the exhaust-gas cleaning device is provided between the battery and the reducing-agent tank.

According to the present configuration, a load of the reducing-agent pump is applied between the battery and the reducing-agent tank. As such, the reducing-agent pump can be disposed while ensuring that a weight in the vehicle-body lateral width direction does not collapse or substantially collapse due to the load of the reducing-agent pump.

In one or more embodiments of the present invention, a hose is extended from the reducing-agent pump and toward a vehicle-body horizontal side portion, passing below the battery.

According to the present configuration, the hose, which extends from the reducing-agent tank and toward the vehicle-body horizontal side portion, is kept from circumventing the battery on a front side or a back side of the battery. As such, the hose is kept from excessive bending.

In one or more embodiments of the present invention, provided is a pump support member (i.e., a pump supporting tool) that is provided between the battery and the reducing-agent pump and is connected to and supports the reducing-agent pump, provided is a fixing member (i.e., a fixture) that abuts an upper face of the battery and presses and fixes the battery to a mounting base (by pressing the battery against the mounting base), and the pump support member is provided with a support portion that supports one end portion of the fixing member.

According to the present configuration, the fixing member presses and fixes the battery to the mounting base while being firmly supported by the highly rigid pump support member supporting the reducing-agent pump. As such, the battery can be firmly fixed to the mounting base while utilizing the pump support member as a support member of the fixing member to provide a simple support structure of the fixing member.

DETAILED DESCRIPTION OF EMBODIMENTS

Embodiments of the present invention are described below based on the drawings.

Figure 1:
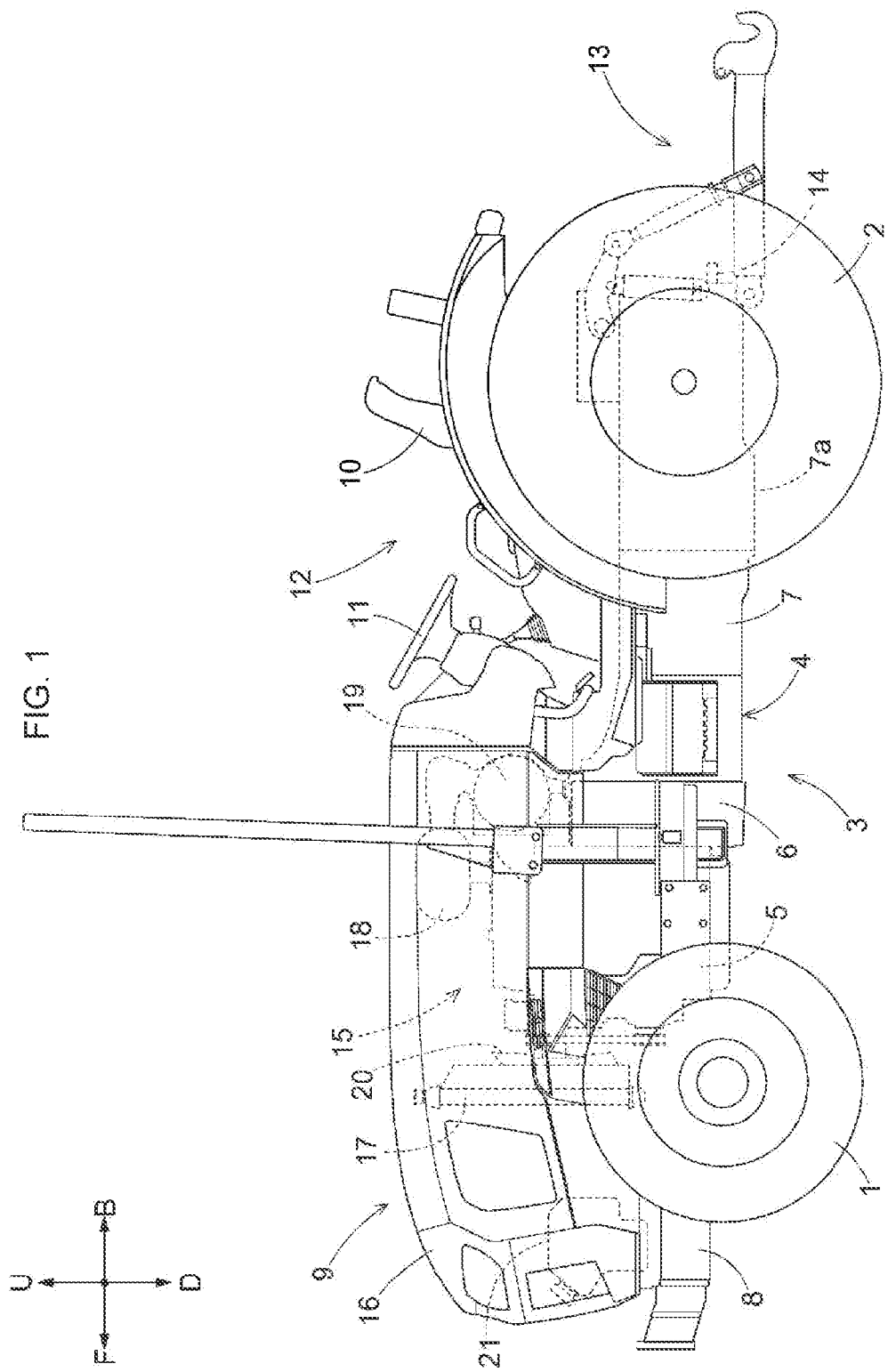
FIG. 1 is a left side view illustrating an entirety of a tractor.

Note that in the following description, in regards to a traveling vehicle body of a tractor, the direction of arrow F illustrated in FIG. 1 is defined as "vehicle-body front", the direction of arrow B is defined as "vehicle-body back", the direction of arrow U is defined as "vehicle-body up", the direction of arrow D is defined as "vehicle-body down", the direction heading toward the surface of the page is defined as "vehicle-body left", and the direction heading toward the reverse face of the page is defined as "vehicle-body right".

Overall Configuration of Tractor

As illustrated in FIG. 1, the tractor is provided with a traveling vehicle body 3 supported by a pair of left and right front wheels 1, which can be steered and driven, and a pair of left and right back wheels 2, which can be driven. A vehicle body frame 4 of the traveling vehicle body 3 is constituted by an engine 5, a flywheel housing 6 connected to a back portion of the engine 5, a clutch housing 7 connected to a back portion of the flywheel housing 6, a transmission case 7a connected to a back portion of the clutch housing 7, and a front frame 8 connected to a lower portion of the engine 5. A motor unit 9 provided with the engine 5 is formed in a front portion of the traveling vehicle body 3. A driver's seat 10 and a driving unit 12, which is provided with a steering wheel 11 whereby a steering operation of the front wheels 1 is performed, are formed in a back portion of the traveling vehicle body 3. A linking mechanism 13, which connects a work apparatus such as a rotary tilling apparatus (not illustrated) in a manner enabling a raising and lowering operation of the work apparatus, and a power takeoff shaft 14, which takes power from the engine 5 and outputs this to the connected work apparatus, are provided in a back portion of the transmission case 7a.

Configuration of Motor Unit

As illustrated in FIG. 1, the motor unit 9 is provided with an engine compartment 15. The engine compartment 15 is formed by an engine bonnet 16, which covers the engine compartment 15 from above and the front, and the like.

As illustrated in FIG. 1, the engine 5, a radiator 17 that cools the engine 5, and a first exhaust-gas cleaning device (DPF) 18 and second exhaust-gas cleaning device (SCR) 19 that perform cleaning processes of exhaust gas exhausted by the engine 5 are provided in the engine compartment 15.

Configuration of Radiator

As illustrated in FIG. 1, the radiator 17 is disposed further toward a front side than the engine 5. A blowing action of a rotary fan 20 positioned between the radiator 17 and the engine 5 introduces cooling air from outside the engine compartment 15 to inside the engine compartment and supplies the cooling air to the radiator 17. In the radiator 17, engine cooling water is cooled by heat exchange between the supplied cooling air and the engine cooling water. The engine 5 is cooled by the cooled engine cooling water being supplied to the engine 5.

Configurations of Exhaust-Gas Cleaning Devices

The engine 5 is a diesel engine. As illustrated in FIG. 1, the first exhaust-gas cleaning device 18 is provided above the engine 5. In the first exhaust-gas cleaning device 18, the exhaust gas exhausted by the engine 5 is suctioned into the device, and diesel microparticles included in the suctioned exhaust gas are collected by a collection filter (not illustrated). This performs an exhaust-gas cleaning process of decreasing the diesel microparticles.

As illustrated in FIG. 1, the second exhaust-gas cleaning device 19 is provided behind the engine 5. In the second exhaust-gas cleaning device 19, the exhaust gas discharged by the first exhaust-gas cleaning device 18 is introduced into the device, and the introduced exhaust gas is subjected to a cleaning process by a reducing agent. Specifically, aqueous urea as the reducing agent is injected into the introduced exhaust gas, hydrolyzing the exhaust gas. This performs an exhaust-gas cleaning process of decreasing nitrogen oxides included in the exhaust gas. The exhaust gas subjected to the cleaning process is discharged from an exhaust pipe (not illustrated) connected to the second exhaust-gas cleaning device 19.

Configurations of Reducing-Agent Tank, Reducing-Agent Pump, and Battery

Figure 2:
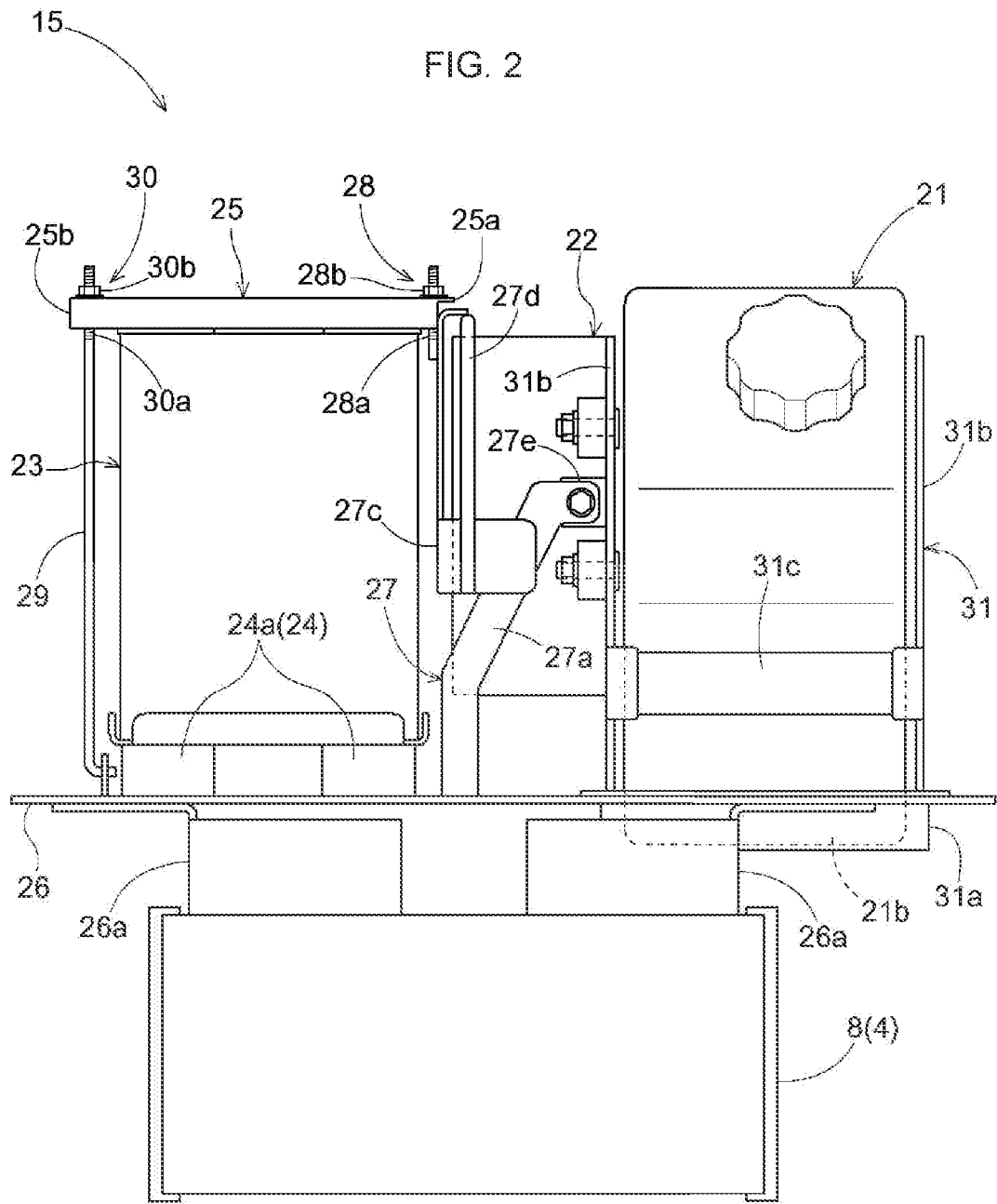
FIG. 2 is a front view illustrating a reducing-agent tank, a reducing-agent pump, and a battery.

As illustrated in FIGS. 1 and 2, in the engine compartment 15, a reducing-agent tank 21 that stores the aqueous urea as the reducing agent, a reducing-agent pump 22, and a battery 23 are disposed further toward a vehicle-body front side than the radiator 17. A configuration is such that the reducing-agent pump 22 is driven by electric power from the battery 23 and the aqueous urea stored in the reducing-agent tank 21 is supplied by the reducing-agent pump 22 to the second exhaust-gas cleaning device 19.

Figure 3:
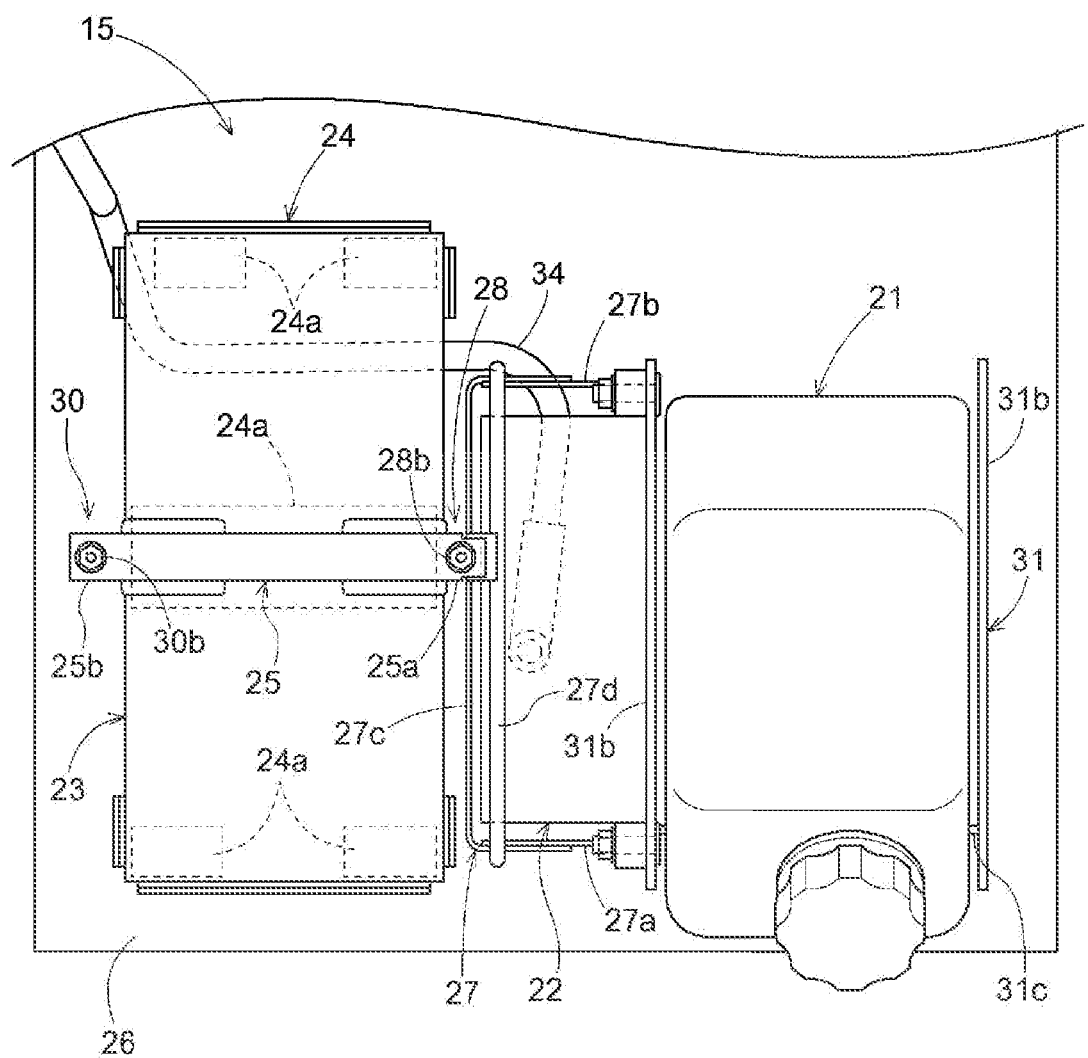
FIG. 3 is a plan view illustrating the reducing-agent tank, the reducing-agent pump, and the battery.

As illustrated in FIGS. 2 and 3, the reducing-agent tank 21 is provided in a side-by-side state with the battery 23. The reducing-agent pump 22 is provided in a side-by-side state with the reducing-agent tank 21 on a horizontal side of the battery 23. Specifically, the reducing-agent tank 21, the reducing-agent pump 22, and the battery 23 are lined up in the vehicle-body lateral width direction in a state wherein the reducing-agent pump 22 is positioned between the reducing-agent tank 21 and the battery 23. In one or more embodiments, the battery 23 is positioned on a vehicle-body right horizontal side of the reducing-agent pump 22, and the reducing-agent tank 21 is positioned on a vehicle-body left horizontal side of the reducing-agent pump 22. However, it is possible to adopt an arrangement configuration wherein the battery 23 is positioned on the vehicle-body left horizontal side of the reducing-agent pump 22 and the reducing-agent tank 21 is positioned on the vehicle-body right horizontal side of the reducing-agent pump 22.

Configuration of Battery

Figure 7:
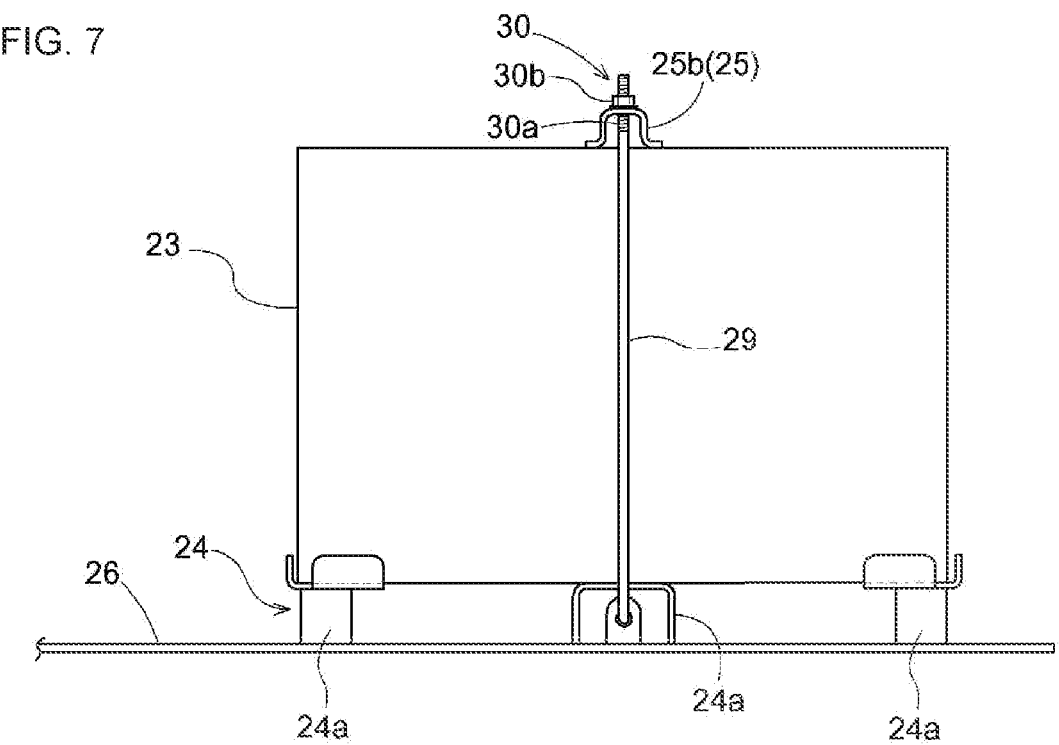
FIG. 7 is a right side view illustrating a second support member.

As illustrated in FIGS. 2 and 3, the battery 23 is configured so as to be mounted on a mounting base 24 and pressed and fixed to the mounting base 24 by a fixing member (i.e., the fixture) 25 abutted to an upper face of the battery 23. A plan-view shape of the battery 23 is rectangular, and the battery 23 is configured so as to be mounted on the mounting base 24 in a state wherein a plan-view long side of the battery is substantially parallel to the vehicle-body front-back direction. In one or more embodiments, as illustrated in FIGS. 3 and 7, the mounting base 24 is constituted by three divisional mounting bases 24a lined up at intervals in the vehicle-body front-back direction. The mounting base 24 is supported by a support plate 26 provided on a vehicle-body upper side of the front frame 8 constituting the vehicle body frame 4. The battery 23 is supported by the support plate 26 via the mounting base 24. As illustrated in FIG. 2, the support plate 26 is supported by the front frame 8 by a leg body portion 26a, provided on a lower-face side of the support plate 26, being connected to the front frame 8.

Figure 6:
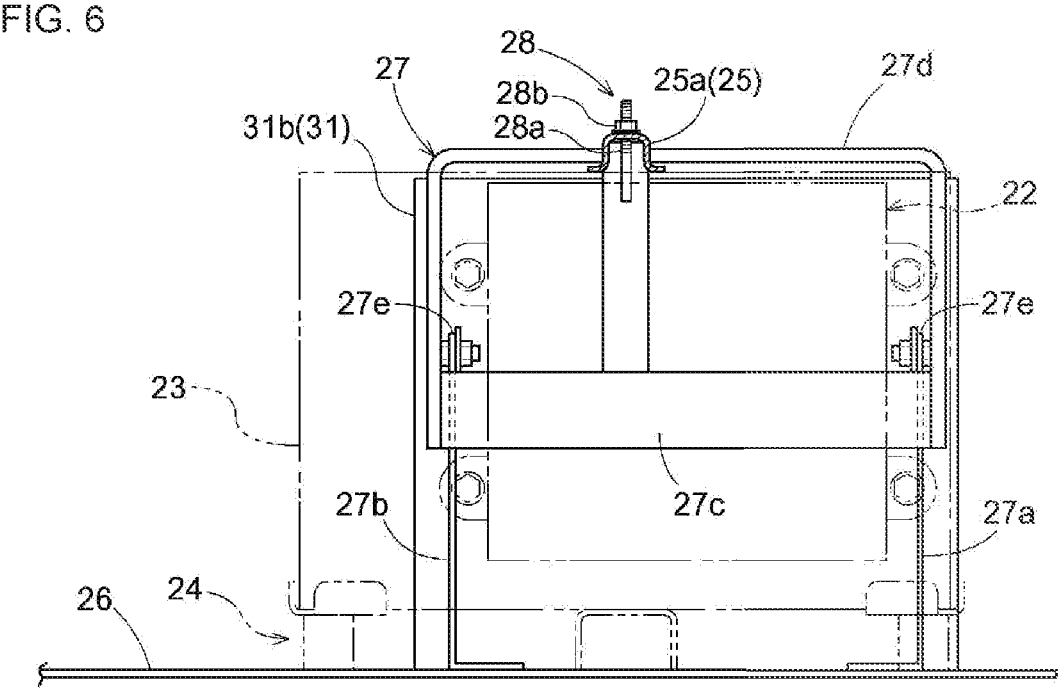
FIG. 6 is a right side view illustrating a pump support member.

As illustrated in FIGS. 2 and 3, one end portion 25a of the fixing member 25 fixing the battery 23 to the mounting base 24 is configured to be supported by a support portion 28 provided to a pump support member (i.e., the pump supporting tool) 27 provided between the battery 23 and the reducing-agent pump 22. The pump support member 27 is upwardly erected from the support plate 26 and is supported by the support plate 26. As illustrated in FIGS. 2 and 6, the support portion 28 is provided with a screw shaft portion 28a, onto which the one end portion 25a of the fixing member 25 is detachably fitted, and a pressing member 28b, which detachably engages the screw shaft portion 28a on an upper side of the one end portion 25a fitted onto the screw shaft portion 28a. The pressing member 28b is configured to retain the one end portion 25a fitted onto the screw shaft portion 28a and so performed is an operation of pressing the one end portion 25a to the battery 23 by a tightening operation being performed.

As illustrated in FIGS. 2 and 3, another end portion 25b of the fixing member 25 is configured to be supported by a second support portion 30 provided to a second support member 29 provided on the opposite side of a reducing-agent-pump side relative to the battery 23. The second support member 29 is configured to extend upward from the support plate 26. As illustrated in FIG. 7, the second support portion 30 is provided with a second screw shaft portion 30a, onto which the other end portion 25b of the fixing member 25 is detachably fitted, and a second pressing member 30b, which detachably engages the second screw shaft portion 30a on an upper side of the other end portion 25b fitted onto the second screw shaft portion 30a. The second pressing member 30b is configured to retain the other end portion 25b fitted onto the second screw shaft portion 30a and so performed is an operation of pressing the other end portion 25b to the battery 23 by a tightening operation being performed.

In the fixing member 25, the one end portion 25a is attached to the support portion 28 of the pump support member 27 and is subjected to the operation of being pressed to the battery 23 by the pressing member 28b, and the other end portion 25b is attached to the second support portion 30 of the second support member 29 and is subjected to the operation of being pressed to the battery 23 by the second pressing member 30b. This abuts the fixing member to the upper face of the battery 23 and presses and fixes the battery 23 to the mounting base 24.

Configuration of Reducing-Agent Tank

Figure 5:
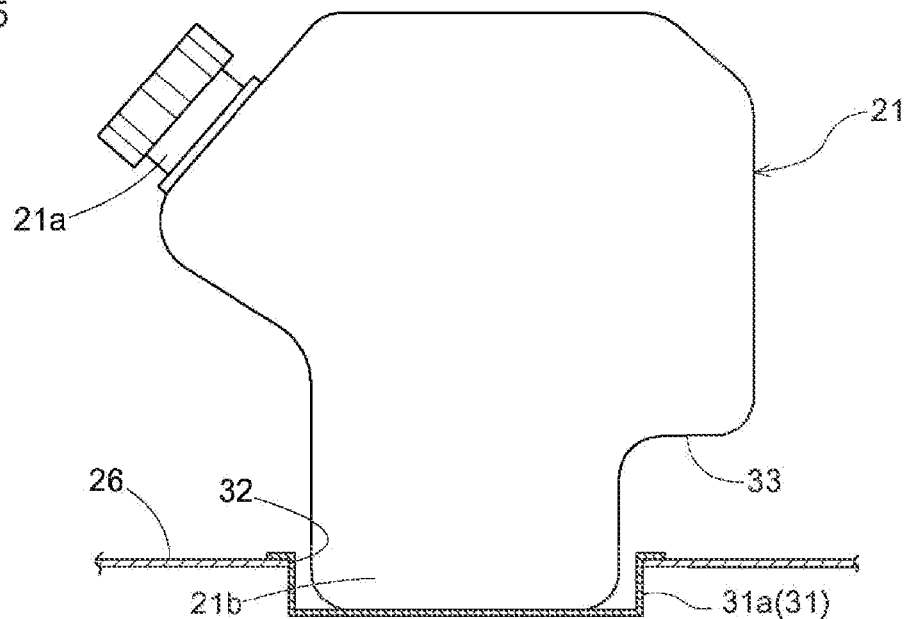
FIG. 5 is a left side view illustrating the reducing-agent tank and a cross section of a support plate.

As illustrated in FIG. 5, a supply tube 21a is extended forward and upward from an upper portion of the reducing-agent tank 21. The reducing-agent tank 21 stores the aqueous urea as the reducing agent by the aqueous urea being supplied from the supply tube 21a.

As illustrated in FIGS. 2 and 3, the reducing-agent tank 21 is supported by a tank case 31. The tank case 31 is provided with a bottom portion 31a, which receives a lower portion 21b of the reducing-agent tank 21 from below, and side plate portions 31b, which rise from the bottom portion 31a to both horizontal sides of the reducing-agent tank 21. A connecting portion 31c that connects the side plate portions 31b on both horizontal sides by passing in front of the reducing-agent tank 21 is provided across the side plate portions 31b on both horizontal sides. The left and right side plate portions 31b are supported by the bottom portion 31a, and the bottom portion 31a is supported by the support plate 26 in a state of being placed in an opening 32 provided in the support plate 26. The reducing-agent tank 21 is supported by the support plate 26 via the tank case 31.

Figure 4:
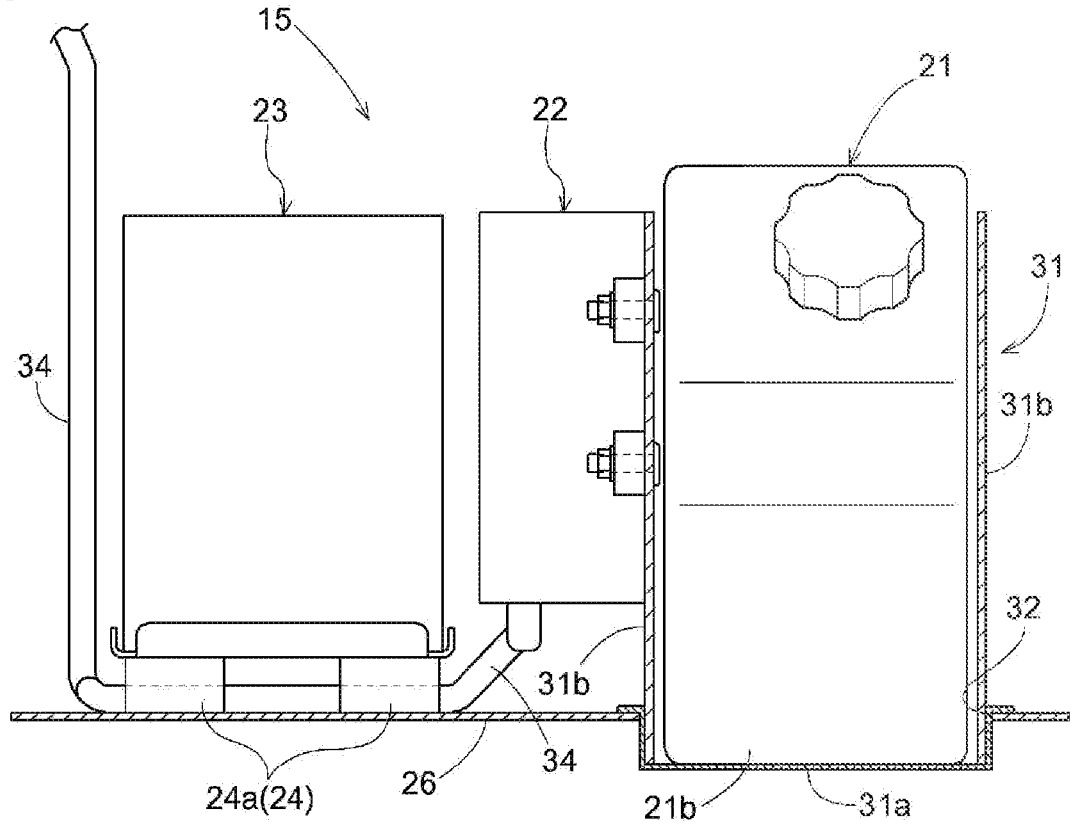
FIG. 4 is a front view illustrating a disposition of a hose connected to the reducing-agent pump.

As illustrated in FIGS. 2, 4, and 5, the lower portion 21b of the reducing-agent tank 21 extends below the support plate 26 through the opening 32 of the support plate 26. As illustrated in FIG. 5, a notch portion 33 is provided in a lower corner portion of the reducing-agent tank 21. The notch portion 33 is provided across an entire width of the reducing-agent tank 21. The lower portion 21b extending below the support plate 26 enables a capacity of the reducing-agent tank 21 to be increased. The notch portion 33 suppresses the increasing of the capacity so the capacity does not increase excessively. In one or more embodiments, the notch portion 33 is provided in a back lower corner portion of the reducing-agent tank 21 but can be provided in a front lower corner portion.

Configuration of Reducing-Agent Pump

As illustrated in FIGS. 2 and 4, the reducing-agent pump 22 is positioned on an upper-face side of the support plate 26. As illustrated in FIGS. 2 and 6, the reducing-agent pump 22 is configured to be supported by the pump support member 27 provided between the battery 23 and the reducing-agent pump 22 and to be supported by the support plate 26 via the pump support member 27.

Specifically, as illustrated in FIGS. 2 and 6, the pump support member 27 is provided with a front strut portion 27a, which rises upward from the support plate 26, and a back strut portion 27b, which rises upward from the support plate 26 on a back side of the front strut portion 27a. A pump support portion 27e connected to the reducing-agent pump 22 is provided to an upper portion of the front strut portion 27a and an upper portion of the back strut portion 27b. The side plate portion 31b on a reducing-agent-pump side of the tank case 31 is connected to the pump support portion 27e of the front strut portion 27a and the back strut portion 27b. The pump support portion 27e supports the reducing-agent pump 22 via the side plate portion 31b. A first connecting portion 27c and a second connecting portion 27d that connect the front strut portion 27a and the back strut portion 27b are provided across the upper portion of the front strut portion 27a and the upper portion of the back strut portion 27b. The support portion 28 that supports the one end portion 25a of the fixing member 25 is formed on the second connecting portion 27d.

As illustrated in FIGS. 3 and 4, a hose 34 connecting the reducing-agent pump 22 and the second exhaust-gas cleaning device 19 is connected to a bottom portion of the reducing-agent pump 22. The hose 34 extends from the bottom portion of the reducing-agent pump 22 and toward a vehicle-body horizontal side portion, passing below the battery 23. The hose 34 is disposed so as to pass between adjacent divisional mounting bases 24a in a space between the battery 23 and the support plate 26. The hose 34 can be pulled out from the reducing-agent pump 22 to the vehicle-body horizontal side portion without circumventing the battery 23 in front of or behind the battery.

Other Embodiments (1) The above embodiments illustrate an example wherein the reducing-agent pump 22 is provided between the reducing-agent tank 21 and the battery 23, in a side-by-side state with the reducing-agent tank 21. However, the present invention is not limited thereto, and the reducing-agent pump 22 may be provided in any location, such as outside the engine compartment 15 or in a location away from the reducing-agent tank 21 and the battery 23.

(2) The above embodiments illustrate an example wherein the battery 23 is provided in a state wherein the long side of the battery is substantially parallel to the vehicle-body front-back direction. However, the present invention is not limited thereto, and the battery may be provided in a state wherein the long side is substantially parallel to the vehicle-body lateral width direction.

(3) The above embodiments illustrate an example wherein the reducing-agent tank 21 is provided with a lower portion 21b that extends below the support plate 26 and with a notch portion 33 that is provided in the lower corner portion. However, the present invention is not limited thereto, and adopted may be a reducing-agent tank 21 wherein the lower portion 21b does not extend below the support plate 26 and no notch portion 33 is provided.

(4) The above embodiments illustrate an example wherein the pump support member 27 is provided with the support portion 28. However, the present invention is not limited thereto, and provided may be a dedicated support member that supports the one end portion 25a of the fixing member 25.

(5) The above embodiments illustrate an example configured so the hose 34 passes below the battery 23. However, the present invention is not limited thereto, and the hose may pass on a front side or a back side of the battery 23 instead of below the batter 23.

Industrial Applicability

One or more embodiments of the present invention can be applied in tractors provided with an exhaust-gas cleaning device that uses a reducing agent to subject exhaust gas exhausted by an engine to a cleaning process.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. A tractor comprising:
   a vehicle body;
   an engine disposed in an engine compartment;
   a radiator that is disposed, in the engine compartment, further toward a vehicle-body front side than the engine and cools the engine;
   an exhaust-gas cleaning device that purifies exhaust gas exhausted from the engine using a reducing agent;
   a reducing-agent tank that stores the reducing agent supplied to the exhaust-gas cleaning device; and
   a battery, wherein
   in the engine compartment, the reducing-agent tank and the battery are disposed further toward the vehicle-body front side than the radiator and arranged side-by-side in a vehicle-body right and left direction.
2. The tractor of claim 1, further comprising:
   a reducing-agent pump that supplies the reducing agent from the reducing-agent tank to the exhaust-gas cleaning device, wherein
   the reducing-agent pump is disposed side-by-side with the reducing-agent tank on a lateral side of the battery.
3. The tractor of claim 1, wherein
   the battery is disposed in the tractor such that a long side of the battery is substantially parallel to a vehicle-body front-back direction.
4. The tractor of claim 1, further comprising:
   a vehicle body frame;
   a mounting base of the battery; and
   a support plate that is disposed on an upper portion than the vehicle body frame and supports the mounting base, wherein
   the reducing-agent tank has a lower portion extending lower than the support plate, and
   the reducing-agent tank has a notch portion at a lower corner portion of the reducing-agent tank.

5. The tractor of claim 1, further comprising:
a reducing-agent pump that supplies the reducing agent from the reducing-agent tank to the exhaust-gas cleaning device, wherein
the reducing-agent pump is disposed between the battery and the reducing-agent tank.

6. The tractor of claim 5, further comprising:
a hose that extends from the reducing-agent pump toward a vehicle-body horizontal side portion, passing below the battery.

7. The tractor of claim 5, further comprising:
a pump supporting tool that is disposed between the battery and the reducing-agent pump and is connected to the reducing-agent pump, supporting the reducing-agent pump;
a mounting base of the battery;
a fixture that abuts an upper face of the battery and fixes the battery by pressing the battery against the mounting base, wherein
the pump supporting tool comprises a support portion that supports one end portion of the fixture.

8. The tractor of claim 1, further comprising:
a support plate;
a mounting base disposed on the support plate; and
a tank case supported by the support plate, wherein
the battery is mounted on the mounting base, and
a part of the reducing-agent tank is housed in the tank case.

* * * * *